(12) United States Patent
Ahn et al.

(10) Patent No.: US 10,035,881 B2
(45) Date of Patent: Jul. 31, 2018

(54) METHOD OF FORMING AN ORGANOSILICON PRODUCT USING A MEMBRANE CONTACTOR TO REACT A GAS AND LIQUID

(71) Applicant: Dow Corning Corporation, Midland, MI (US)

(72) Inventors: Dongchan Ahn, Midland, MI (US); Paul C. Dinh, Midland, MI (US); Michael S. Ferritto, Midland, MI (US); Don L. Kleyer, Hemlock, MI (US); James F. Thompson, Sanford, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 15/316,272

(22) PCT Filed: Jun. 9, 2015

(86) PCT No.: PCT/US2015/034781
§ 371 (c)(1),
(2) Date: Dec. 6, 2016

(87) PCT Pub. No.: WO2015/191499
PCT Pub. Date: Dec. 17, 2015

(65) Prior Publication Data
US 2017/0210849 A1    Jul. 27, 2017

Related U.S. Application Data

(60) Provisional application No. 62/010,859, filed on Jun. 11, 2014.

(51) Int. Cl.
| | |
|---|---|
| *C07F 7/00* | (2006.01) |
| *C08G 65/336* | (2006.01) |
| *B01J 19/24* | (2006.01) |
| *B01J 19/02* | (2006.01) |

(52) U.S. Cl.
CPC ............ *C08G 65/336* (2013.01); *B01J 19/02* (2013.01); *B01J 19/2475* (2013.01); *B01J 2219/0295* (2013.01); *C08G 2650/04* (2013.01)

(58) Field of Classification Search
CPC .... C08G 65/336; C08G 2650/04; B01J 19/02; B01J 19/2475; B01J 2219/00295
USPC .......................................................... 556/444
See application file for complete search history.

(56) References Cited

U.S. PATENT DOCUMENTS

| | | | |
|---|---|---|---|
| 6,326,506 B1 | 12/2001 | Tachikawa et al. | |
| 6,410,772 B2 | 6/2002 | Okuyama et al. | |
| 8,420,844 B2 | 4/2013 | Divins et al. | |
| 2007/0072954 A1 | 3/2007 | Chappelow et al. | |
| 2010/0004476 A1* | 1/2010 | Divins .................. | C07F 7/0879 556/479 |
| 2010/0267979 A1 | 10/2010 | Bauer et al. | |
| 2015/0190747 A1 | 7/2015 | Ahn et al. | |
| 2015/0231556 A1 | 8/2015 | Ahn et al. | |

FOREIGN PATENT DOCUMENTS

WO    WO2002100528    12/2001

OTHER PUBLICATIONS

Buxbaum NPL 1997; Paper presented at the 15th BCC Membrane Planning Conf, Newton, MA, Oct. 27-29, 1997.*
Buxbaum, 15th BCC Membrane Planning Conf., Newton, MA, Oct. 27-29, 1997.*

* cited by examiner

*Primary Examiner* — Sudhakar Katakam
*Assistant Examiner* — Kofi Adzamli
(74) *Attorney, Agent, or Firm* — Matthew T. Fewkes

(57) ABSTRACT

Various embodiments disclosed relate to method of forming organosilicon products. In various embodiments, the present invention provides a method of forming an organosilicon product that can include contacting a first side of a silicone membrane with a nonvolatile liquid reactant. The method can include contacting a second side of the membrane with a gaseous reactant. The contacting can be sufficient to react the gaseous reactant with the liquid reactant to form an organosilicon product on the first side of the silicone membrane. The silicone membrane can be substantially impermeable to the liquid reactant and substantially permeable to the gaseous reactant.

13 Claims, No Drawings

METHOD OF FORMING AN ORGANOSILICON PRODUCT USING A MEMBRANE CONTACTOR TO REACT A GAS AND LIQUID

CROSS REFERENCE TO RELATED APPLICATIONS

This application is a U.S. national stage filing under 35 U.S.C. § 371 of PCT Application No. PCT/US15/034781 filed on 9 Jun. 2015, currently pending, which claims the benefit of U.S. Provisional Patent Application No. 62/010,859 filed 11 Jun. 2014 under 35 U.S.C. § 119 (e). PCT Application No. PCT/US15/034781 and U.S. Provisional Patent Application No. 62/010,859 are hereby incorporated by reference.

BACKGROUND OF THE INVENTION

Typical methods of reacting a gas with a liquid involve bubbling or sparging of the gas through a liquid. Such methods are sensitive to bubble size and dispersion, prone to flooding, and can result in wasted gas if the residence time or reactor volume is not properly controlled.

SUMMARY OF THE INVENTION

In various embodiments, the present invention provides a method of forming an organosilicon product. The method includes contacting a first side of a membrane with a nonvolatile liquid reactant. The method also includes contacting a second side of the membrane with a gaseous reactant. The contacting is sufficient to react the gaseous reactant with the liquid reactant. The reacting of the gaseous reactant with the liquid reactant forms an organosilicon product on the first side of the membrane. The membrane is substantially impermeable to the liquid reactant and substantially permeable to the gaseous reactant.

In various embodiments, the present invention provides a method of forming an organosilicon product. The method includes contacting a first side of a dense silicone membrane with a nonvolatile liquid reactant including a compound having at least one silicon-bonded hydrogen atom and a platinum group catalyst. The method also includes contacting a second side of the membrane with a gaseous reactant including a compound having at least one carbon-carbon multiple bond. The contacting is sufficient to react the gaseous reactant with the liquid reactant via a hydrosilylation reaction to form an organosilicon product on the first side of the silicone membrane. The silicone membrane is substantially impermeable to the liquid reactant and substantially permeable to the gaseous reactant.

In various embodiments, the present invention provides a method of forming an organosilicon product. The method includes contacting a first side of a dense silicone membrane with a nonvolatile liquid reactant including a compound having at least one carbon-carbon multiple bond and a platinum group catalyst. The method also includes contacting a second side of the membrane with a gaseous reactant including a compound having at least one silicon-bonded hydrogen atom. The contacting is sufficient to react the gaseous reactant with the liquid reactant via a hydrosilylation reaction to form an organosilicon product on the first side of the silicone membrane. The silicone membrane is substantially impermeable to the liquid reactant and substantially permeable to the gaseous reactant.

In various embodiments, the present invention provides a method of forming an organosilicon product. The method includes contacting a first side of a dense silicone membrane with a nonvolatile liquid reactant including an unsaturated organosilicon compound and a hydrogenation catalyst. The method also contacting a second side of the membrane with a gaseous reactant including hydrogen, wherein the contacting is sufficient to react the gaseous reactant with the liquid reactant to form an organosilicon product on the first side of the silicone membrane. The silicone membrane is substantially impermeable to the liquid reactant and substantially permeable to the gaseous reactant.

The present invention provides various advantages over other methods of reacting a gas and liquid, such as over methods including bubbling or sparging of a liquid, at least some of which are unexpected. For example, in various embodiments, the present invention can provide a more efficient method of reacting a gas with a liquid to provide an organosilicon product than other methods, providing at least one of higher yield, higher conversion, reduced process time, less waste of materials, greater process versatility, enhanced reaction selectivity, enhanced product purity, less expensive equipment, lower operating costs, and lower maintenance costs. In various embodiments, the present invention can provide a more reliable method than other methods of reacting a gas and a liquid. In various embodiments, the present invention can provide a method that requires a smaller reactor volume to produce a given amount of product as compared to that required by other methods. In various embodiments, the present invention can provide a method of reacting a liquid and a gas that wastes less gaseous reactant than other methods.

In various embodiments, the present invention can provide a method of reacting a gas and a liquid that is at least one of more convenient and easier to control than other methods, such as over methods including bubbling or sparging of a liquid. For example, in various embodiments, the present invention can provide greater process safety than other methods. In various embodiments, the present invention provides a method that can avoid the risk of flooding associated with methods including bubbling or sparging a gas through a liquid. In various embodiments, the present invention can provide more facile control of reaction temperatures. In various embodiments, the present invention can provide finer independent control of liquid and gas flow rates than possible using other methods. In various embodiments, the present invention can provide a continuous process for reacting a gas and a liquid.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O) OR, N(R)C(O)R, N(R)C(S)R, N(R)C(O)N(R)$_2$, N(R)C(S)N (R)$_2$, N(COR)COR, N(OR)R, C(=NH)N(R)$_2$, C(O)N(OR) R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "monovalent" as used herein refers to a substituent connecting via a single bond to a substituted molecule. When a substituent is monovalent, such as, for example, F or Cl, it is bonded to the atom it is substituting by a single bond.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "resin" as used herein refers to polysiloxane material of any viscosity that includes at least one siloxane monomer that is bonded via a Si—O—Si bond to three or four other siloxane monomers. In one example, the polysiloxane material includes T or Q groups, as defined herein.

The term "cure" as used herein refers to exposing to radiation in any form, heating, or allowing to undergo a physical or chemical reaction that results in hardening or an increase in viscosity.

The term "pore" as used herein refers to a depression, slit, or hole of any size or shape in a solid object. A pore can run all the way through an object or partially through the object. A pore can intersect other pores.

The term "free-standing" or "unsupported" as used herein refers to a membrane with the majority of the surface area on each of the two major sides of the membrane not contacting a substrate, whether the substrate is porous or not. In some embodiments, a membrane that is "free-standing" or "unsupported" can be 100% not supported on both major sides. A membrane that is "free-standing" or "unsupported" can be supported at the edges or at the minority (e.g., less than about 50%, or about 45%, 35, 30, 25, 20, 15, 10, 5, 4, 3, 2, or about 1% or less) of the surface area on either or both major sides of the membrane.

The term "supported" as used herein refers to a membrane with the majority of the surface area on at least one of the two major sides contacting a substrate, whether the substrate is porous or not. In some embodiments, a membrane that is "supported" can be 100% supported on at least one side. A membrane that is "supported" can be supported at any suitable location at the majority (e.g., more than about 50%, or about 55%, 60, 65, 70, 75, 80, 85, 90, 95, 96, 97, 98, or about 99% or more) of the surface area on either or both major sides of the membrane.

The term "solvent" as used herein refers to a liquid that can dissolve a solid, liquid, or gas. Nonlimiting examples of solvents are silicones, organic compounds, water, alcohols, ionic liquids, and supercritical fluids.

The term "selectivity" or "ideal selectivity" as used herein refers to the ratio of permeability of the faster permeating gas over the slower permeating gas, measured at room temperature.

The term "permeability" as used herein refers to the permeability coefficient ($P_x$) of substance X through a membrane, where $q_{mx}=P_x*A*\Delta p_x*(1/\delta)$, where $q_{mx}$ is the volumetric flow rate of substance X through the membrane, A is the surface area of one major side of the membrane through which substance X flows, $\Delta p_x$ is the difference of the partial pressure of substance X across the membrane, and $\delta$ is the thickness of the membrane. $P_x$ can also be expressed as $V \cdot \delta/(A \cdot t \cdot \Delta p)$, wherein $P_x$ is the permeability for a gas X in the membrane, V is the volume of gas X which permeates through the membrane, $\delta$ is the thickness of the membrane, A is the area of the membrane, t is time, $\Delta p$ is the pressure difference of the gas X at the retente and permeate side. Permeability is measured at room temperature, unless otherwise indicated.

The term "Barrer" or "Barrers" as used herein refers to a unit of permeability, wherein 1 Barrer=$10^{-11}$ ($cm^3$ gas) cm $cm^{-2}$ $s^{-1}$ $mmHg^{-1}$, or $10^{-10}$ ($cm^3$ gas) cm $cm^{-2}$ $s^{-1}$ cm $Hg^{-1}$, where "$cm^3$ gas" represents the quantity of the gas that would take up one cubic centimeter at standard temperature and pressure.

The term "total surface area" as used herein with respect to membranes refers to the total surface area of one side of the membrane, such as the portion of a side that is exposed to a gaseous reactant or liquid reactant.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to a temperature of about 15° C. to 28° C.

The term "standard temperature and pressure" as used herein refers to 20° C. and 101 kPa.

As used herein, the term "polymer" refers to a molecule having at least one repeating unit and can include copolymers.

Method of Forming an Organosilicon Product.

In various embodiments, the present invention provides a method of forming an organosilicon product that includes contacting a first side of a membrane with a nonvolatile liquid reactant, and at least partially simultaneously contacting a second side of the membrane with a gaseous reactant. During the contacting, the gaseous reactant can permeate the membrane and can react with the liquid reactant. The membrane can be substantially impermeable to the liquid reactant and substantially permeable to the gaseous reactant. The liquid reactant, the gaseous reactant, or a combination thereof, can include one or more silicon-containing compounds. The reacting of the gaseous reactant and the liquid reactant forms an organosilicon product on the first side of the membrane.

The reaction between the liquid reactant and the gaseous reactant can be any suitable reaction that produces an organosilicon product. In some embodiments, the reaction can be at least one of a hydrosilylation reaction, a condensation reaction, a free-radical reaction, and a reaction of amine group with an epoxy group. In some embodiments, the reaction can be a hydrosilylation reaction, such as at least one of capping silicon-hydrides with olefins and producing silicone polyethers. In some embodiments, the reaction can be a hydrogenation reaction, with the gaseous reactant including hydrogen and with the liquid reactant including carbon-carbon unsaturated bonds that become saturated in the production of the product.

In some embodiments, at least one or both of the gaseous reactant and the liquid reactant can be continuously fed to the membrane. At least one or both of the gaseous reactant and the liquid reactant can be at least one of recycled (e.g., fed back to the respective side of the membrane after the contacting) and fed to a collection tank or vent. In one embodiment, the membrane is in the form of a dense silicone hollow fiber module, and the liquid reactant is fed to the shell side (e.g., the first side or permeate side), while the gas is fed counter-current to the bore side (e.g., the second side or retentate side).

Flow configurations of the gaseous reactant and the liquid reactant can include any suitable flow pattern, such as at least one of cross-current, counter-current, co-current, and radial flow relationships. The flow configuration can include multiple flow patterns, for example about 10, 20 30, 40, 50, 60, 70, 80, or 90 vol % of the gaseous reactant and the liquid reactant can have a cross-current flow while the other about 90, 80, 70, 60, 50, 40, 30, 20, or 10 vol % of the gaseous reactant and the liquid reactant can have another flow pattern. Any suitable combination of flow patterns is encompassed within embodiments of the present invention. The flow rate of the liquid reactant on one side of a membrane, and the flow rate of the gaseous reactant on the other side of the membrane can be varied independently to give any suitable liquid reactant to gaseous reactant flow ratio for a membrane system.

The liquid and gaseous reactant can be contacted to the membrane (e.g., one or more membranes) in any suitable fashion. In some embodiments, the gaseous reactant can be allowed to contact the membrane at a pressure such that there is a positive gradient in partial pressure of the gaseous reactant across the membrane to drive the permeation of the gaseous reactant into the first side of the membrane (e.g., the permeate side of the membrane). In one example, the gaseous reactant is allowed to contact the membrane at approximately ambient pressure. In some embodiments, the liquid reactant is allowed to contact the membrane such that a pressure difference between the first and second sides of the membrane occurs. The pressure difference can be such that the pressure of the liquid reactant (on the first side of the membrane) is greater than the pressure at the second side of the membrane. In one example, the pressure difference is caused by the pressure of the gaseous reactant being at above ambient pressure; in such examples, the pressure of the gaseous reactant can be raised above ambient pressure using any suitable means, such as with a pump. In another example, the pressure difference is caused by the pressure at the first side of the membrane being at or below ambient pressure.

In some embodiments, the temperature of the liquid reactant can be adjusted to provide a desired rate of reaction, depending on the nature of the gaseous reactant and the membrane. The temperature of the liquid reactant can be any suitable temperature, such as about room temperature to about 150° C., about −40° C. to about 250° C., about 30° C. to about 150° C., about 40° C. to about 110° C., about 50° C. to about 90° C., or about room temperature, or about −40° C. or less, or about −35° C., −30, −25, −20, −15, −10, −5, 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 170, 180, 190, 200, 210, 220, 230, 240° C., or about 250° C. or more. In some embodiments, the gaseous reactant can be introduced to the second side of the membrane at a favorable temperature and pressure to at least one of achieve a more rapid transfer of the gaseous reactant to the first side of the membrane (e.g., to increase the flux of the gaseous reactant across the membrane) and to achieve a particular rate of reaction at the first side of the membrane. The gaseous reactant can be any suitable temperature during the contacting, such as about −60° C. to about 150° C., about −30° C. to about 150° C., about −20° C. to about 150° C., about −10° C. to about 150° C., about 0° C. to about 150° C., about 10° C. to about 150° C., about 20° C. to about 150° C., about 10° C. to about 110° C., about 10° C. to about 90° C., or about −60° C. or less, or about −55° C., −50, −45, −40, −35, −30, −25, −20, −15, −10, −5, 0, 5, 10, 15, 20, 25, 30, 40, 50, 55, 60, 65, 70, 75, 80, 85, 90, 95, 100, 105, 110, 115, 120, 125, 130, 135, 140, 145° C., or about 150° C. or more.

The liquid reactant can have any suitable pressure during the contacting with the first side of the membrane. For example, the pressure of the liquid reactant can be 0.01 bar to about 100,000 bar, or about 0.5 bar to about 5 bar, or about 0.01 bar or less, 0.05, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, 100, 150, 200, 250, 500, 750, 1,000, 1,500, 2,500, 5,000, 10,000, 50,000, or about 100,000 bar or more. The gaseous reactant can have any suitable pressure during the contacting with the second side of the membrane. For example, the pressure of the gaseous reactant can be about 0.000,01 bar to about 100 bar, or about 0.001 bar to about 10 bar, or about 0.000,01 bar or less, about 0.000,1 bar, 0.001, 0.01, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, or about 100 bar or more. The pressure differential between the liquid reactant and the gaseous reactant can be any suitable pressure differential, such that the method can be carried out as described herein. For example, the pressure differential between the liquid reactant and the gaseous reactant can be about 0 bar, about 0.000,01 bar to about 100,000 bar, or about 0.01 bar to about 10,000 bar, or about 0.000,01 bar or less, about 0.000,1 bar, 0.001, 0.01, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, 100, 150, 200, 250, 500, 750, 1,000, 1,500, 2,500, 5,000, 10,000, 50,000, or about 100,000 bar or more.

The flow rate of each of the liquid reactant and the gaseous reactant can be any suitable flow rate. For example, the flow rate of the liquid reactant can be about 0.001 L/min to about 100,000 L/min, about 0.1 L/min to about 100 L/min, or about 0.001 L/min or less, 0.01 L/min, 0.1, 1, 2, 4, 6, 8, 10, 15, 20, 25, 50, 75, 100, 150, 200, 250, 500, 750, 1,000, 1,500, 2,500, 5,000, 7,500, 10,000, 15,000, 20,000, 25,000, 50,000, 75,000, or about 100,000 L/min or more. The flow rate of the gaseous reactant can be 0.001 L/min to about 100,000 L/min, about 0.1 L/min to about 100 L/min, or about 0.001 L/min or less, 0.01 L/min, 0.1, 1, 2, 4, 6, 8, 10, 15, 20, 25, 50, 75, 100, 150, 200, 250, 500, 750, 1,000, 1,500, 2,500, 5,000, 7,500, 10,000, 15,000, 20,000, 25,000, 50,000, 75,000, or about 100,000 L/min or more. In some examples, the flow rate of at least one of the liquid reactant and the gaseous reactant can be about 1 to 100,000,000 $cm^3/min$ per 1 $m^2$ of membrane area, 1 to 100,000 $cm^3/min$ per 1 $m^2$ of membrane area, 1 to 10,000 $cm^3/min$ per 1 $m^2$ of membrane area, about 2 to about 5,000 $cm^3/min$ per 1 $m^2$ of membrane area, about 5 to about 20 $cm^3/min$ per 1 $m^2$ of membrane area, or about 1 $cm^3/min$ per 1 $m^2$ of membrane area or less, or about 2, 3, 4, 5, 6, 8, 10, 12, 14, 16, 18, 20, 22, 24, 26, 28, 30, 35, 40, 45, 50, 60, 75, 100, 150, 200, 300, 400, 500, 750, 1,000, 2,500, 5,000, 7,500, 10,000, 20,000, 50,000, 75,000, 100,000, 200,000, 500,000, 750,000, 1,000, 000, 5,000,000, 10,000,000, 20,000,000, 50,000,000, or about 100,000,000 $cm^3/min$ per 1 $m^2$ of membrane area or more.

Membrane.

The membrane can be any suitable membrane or combination of membranes as described further herein. For example, the method can include contacting the liquid reactant and the gaseous reactant across a single membrane, or a bank or array of membranes of any size, shape, or form factor, including a module of hollow fiber membranes. The one or more membranes can be selectively permeable to the gaseous reactant, such as in an embodiment wherein the gaseous reactant is dissolved or mixed with other unreactive materials; in other embodiments, the one or more membranes permit unreactive materials (e.g., materials unreactive with the liquid reactant, or reactive at a lower rate than the gaseous reactant, at the second side of the membrane (e.g., the retentate side) to permeate to the first side (e.g., the permeate side) along with the gaseous reactant.

The membrane can be made of any suitable materials, such that the method can be performed as described herein. The membrane can include a polymer such as cellulose acetate, nitrocellulose, a cellulose ester, polysulfone, a polyether sulfone, polyacrylonitrile, polyamide, polyimide, a polyethylene, a polypropylene, polytetrafluoroethylene, polyvinylidene fluoride, or polyvinyl chloride. The membrane can include a polymer that is crosslinked or not crosslinked. For example, the membrane can include a crosslinked polymer, such as a polyvinyl polymer (e.g., polyvinyl chloride), a natural rubber, a synthetic rubber such as polyisoprene or polybutadiene, an EPDM (ethylene-propylene diene monomer) rubber, a nitrile rubber, an acrylic rubber, a fluoroacrylate rubber, a polyurethane, polyisobutylene, a silicone, or a fluorosilicone. In some embodiments, the membrane can include a thermoplastic (e.g., free of chemical crosslinks), such as a styrenic block copolymer, a thermoplastic polyolefin blend or copolymer, a thermoplastic polyurethane, an elastomeric alloy, thermoplastic polyester copolymer, a polyester-polyether copolymer, a polyamide-polyether copolymer, or a silicone thermoplastic. In some embodiments, the membrane can include materials crosslinked through ionic associations, such as metal salts of carboxylated, sulfonated or maleated polymers and blends of ionic and non-ionic polymers comprising such compounds. The membrane can include materials crosslinked chemically or non-chemically through physical crosslinks in phase-separated domains. The membrane can be a ceramic membrane, including inorganic materials such as alumina, titania, zirconia oxides, silicon carbide, or glassy materials. The membrane can be a silicone membrane, such as an organopolysiloxane membrane.

The membrane can be a silicone membrane, e.g., including the cured product of an organosilicon composition. The organosilicon composition can be any suitable organosilicon composition. The curing of the organosilicon composition gives a cured product of the organosilicon composition. The curable organosilicon composition includes at least one suitable organopolysiloxane compound. The silicone composition includes suitable ingredients to allow the composition to be curable in any suitable fashion, for example, hydrosilylation curing, condensation curing, free-radical curing, amine-epoxy curing, radiation curing, cooling, or any combination thereof. In addition to the at least one suitable polysiloxane, the organosilicon composition can include any suitable additional ingredients, including any suitable organic or inorganic component, including components that do not include silicon, or including components that do not include a polysiloxane structure. In some examples, the cured product of the silicone composition includes a polysiloxane.

The curable silicon composition can include an organosilicon compound. The organosilicon compound can be any organosilicon compound. The organosilicon compound can be, for example, a silane (e.g, an organosilane), a polysilane (e.g., an organopolysilane), a siloxane (e.g., an organosiloxane such as an organomonosiloxane or an organopolysiloxane), a polysiloxane (e.g., an organopolysiloxane), or a polysiloxane-organic copolymer, such as any suitable one of such compound as known in the art. The curable silicone composition can contain any number of suitable organosilicon compounds, and any number of suitable organic compounds. An organosilicon compound can include any functional group that allows for curing.

In some embodiments, the organosilicon compound can include a silicon-bonded hydrogen atom, such as organohydrogensilane or an organohydrogensiloxane. In some embodiments, the organosilicon compound can include an alkenyl group, such as an organoalkenylsilane or an organoalkenyl siloxane. In other embodiments, the organosilicon compound can include any functional group that allows for curing. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

The organosilicon compound can be an organopolysiloxane compound. In some examples, the organopolysiloxane compound has an average of at least one, two, or more than two functional groups that allow for curing. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane. The organopolysiloxane compound can be a single organopolysiloxane or a combination including two or more organopolysiloxanes that differ in at least one of structure, viscosity, average molecular weight, siloxane units, and sequence.

The membrane can be a dense membrane, such as a dense silicone membrane. The membrane can be nonporous, such as a nonporous silicone membrane. Some types of pores can penetrate from one major side of a membrane to another major side, such as cylindrical pores shaped approximately as cylinders, or such as sponge pores, for example pores that include randomly shaped cavities or channels, that form a connection from one major side to the other major side. Some types of pores do not penetrate from one major side of a membrane to another major side, such as blind pores, also referred to as surface pores. Some types of sponge pores can also not penetrate from one major side of the membrane to the other major side. In some embodiments, a dense membrane of the present invention can be substantially nonporous, and can include substantially no pores, including both pores that penetrate from one major side to the other major side, and including pores that do not penetrate from one major side to the other major side, such as less than about 100,000 pores per $mm^2$, or less than about 10,000, 1000, 100, 50, 25, 20, 15, 10, 5, or less than about 1 pore per $mm^2$. In some embodiments, a dense membrane can include substantially no pores that penetrate from one side to the other, such as less than about 100,000 penetrating pore per $mm^2$, or less than about 10,000, 1000, 100, 50, 25, 20, 15, 10, 5, or less than about 1 penetrating pore per $mm^2$, but the membrane can also include any suitable number of pores that do not penetrate from one major side of the membrane to the other major side of the membrane, such as at least one of surface pores and sponge pores, such as equal to or more than about 100,000 non-penetrating pores per $mm^2$, or less than 10,000, 1000, 100, 50, 25, 20, 15, 10, 5, or equal to or more than about 1 non-penetrating pore per $mm^2$. In some embodiments, a dense membrane can have substantially zero pores penetrating from one major side of the membrane to the other major side having a diameter larger than about 0.00001, 0.0001, 0.001, 0.005, 0.01, 0.05, 0.1, 0.2, 0.3, 0.4, 0.5, 0.6, 0.7, 0.8, 0.9, 1, or larger than about 2 μm, such as less than about 100,000 pores per $mm^2$, or less than about 10,000, 1000, 100, 50, 25, 20, 15, 10, 5, or less than about 1 pore per $mm^2$. Pore size can be determined by the average size of the pore throughout its path through the entire thickness or only partway through the membrane. Pore size can be determined by the average size of the pore at the surface of the membrane. Any suitable analytical technique can be used to determine the pore size. Embodiments encompass dense membranes having any combination of approximate maximum sizes from the dimensions given in this paragraph for each of the pores passing all the way through the membrane, cylinder pores, sponge pores, blind pores, any other type of pore, or combination thereof. In some embodiments, a dense membrane does have at least one of pores passing all the way through the membrane, cylinder pores, sponge pores, blind pores, and any other type of pore, wherein the pores have a size smaller than the maximum size of the dimensions given in this paragraph.

The membrane can have any suitable thickness. In some examples, the membrane has a thickness of about 1 µm to about 20 µm, or about 2, 3, 4, 5, 6, 7, 8, 9, 10, 11, 12, 13, 14, or 15 µm to about 20 µm. In some examples, the membrane has a thickness of about 0.1 µm to about 300 µm, or about 10, 15, 20, 25, or 30 µm to about 200 µm. In other examples, the membrane has a thickness of about 0.01 µm to about 2000 µm, or about 0.01 µm or less, about 0.1 µm, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 260, 270, 280, 290, 300, 350, 400, 500, 600, 700, 800, 900, 1000, 1250, 1500, 1750 µm, or about 2000 µm or more.

In some embodiments, the membrane has a permeation coefficient of the one or more gaseous reactants of about 0.001 or less, or at least about 0.01 Barrer, 0.1, 1, 5, 10, 20, 30, 40, 50, 60, 70, 80, 90, 100, 120, 140, 160, 180, 200, 240, 280, 300, 400, 500, 600, 700, 800, 900, 1000, 1200, 1400, 1600, 1800, or at least about 2000 Barrer, such as when tested at room temperature without the liquid reactant present on the other side of the membrane (e.g., with air on the other side of the membrane). The membrane can be substantially permeable or substantially impermeable toward other components in a composition on the second side of the membrane that includes the gaseous reactant; in some embodiments, the membrane is substantially impermeable toward other components on the second side of the membrane, whereas in other embodiments, the membrane can be substantially permeable toward one or more other components on the second side of the membrane.

The membrane can be substantially impermeable to the liquid reactant, such that little or no of the liquid reactant passes through the membrane during the method. The membrane can be substantially permeable or substantially impermeable toward other components in a composition on the first side of the membrane that includes the liquid reactant; in some embodiments, the membrane is substantially impermeable toward other components on the first side of the membrane, whereas in other embodiments, the membrane can be substantially permeable toward one or more other components on the first side of the membrane. The permeation coefficient of the liquid reactant can be 0.000,001 Barrer to about 50 Barrer, about 0.000,01 Barrer to about 40 Barrer, about 0.001 Barrer to about 10 Barrer, or about 0.000,001 Barrer or less, about 0.000,01 Barrer, 0.000,1, 0.001, 0.01, 0.1, 1, 2, 3, 4, 5, 6, 7, 8, 9, 10, 12, 14, 16, 18, 20, 25, 30, 35, 40, 45, or about 50 Barrer or more.

The membrane can have any suitable shape. In some examples, the membrane can be a plate-and-frame membrane, spiral wound membrane, tubular membrane, capillary fiber membrane, or hollow fiber membrane. The method can include contacting the gaseous reactant and the liquid reactant across one or more membranes, such as in a hollow fiber membrane module containing a plurality of hollow fiber membranes, each fiber having a bore side and a shell side. The fibers in a hollow fiber membrane module can collectively have a bore side and a shell side accessible through a single connector on each side of the module. Alternately, the fibers in a hollow fiber membrane module can have a bore side and a shell side accessible through multiple connectors placed at various points in the module. In some embodiments of the method, the gaseous reactant can be contacted to the bore side of the one or more hollow fiber membranes (e.g., the second side or the retentate side), and the liquid reactant can be contacted to the shell side (e.g., the first side or the permeate side). In other embodiments of the method, the gaseous reactant can be contacted to the shell side of the one or more hollow fiber membranes (e.g., the second side or the retentate side), and the liquid reactant can be contacted to the bore side (e.g., the first side or the permeate side).

Any number of membranes can be used to accomplish the separation. Any combination of free-standing and supported membranes can be used. Any suitable surface area of the membrane of combination of membranes can be used. For example, the surface area of each membrane, or the total surface area of the membranes, can be about 0.01 $m^2$, 0.1, 1, 2, 3, 4, 5, 10, 100, 200, 300, 400, 500, 600, 700, 800, 900, 1000, 1200, 1400, 1600, 1800, 2000, 2200, 2400, 2600, 2800, 3000, 3200, 3400, 3800, 4000, 5000, 10,000, 50,000, 100,000, 500,000, or about 1,000,000 $m^2$.

In one example, the one or more membranes are one or more hollow tube or fiber membranes. Any number of hollow tube or fiber membranes can be used. For example, 1 hollow tube or fiber membrane, 2, 3, 4, 5, 10, 20, 50, 100, 500, 1000, 2000, 5000, 10,000, 100,000 or about 1,000,000 hollow tube or fiber membranes can be used together as the one or more membranes. In one example, the one or more membranes are crosslinked silicone or organopolysiloxane hollow tube or fiber membranes. In one example, the one or more membranes are one or more free-standing hollow tube or fiber membranes (e.g., having no porous support). In one example, the one or more membranes are crosslinked silicone or organopolysiloxane free-standing hollow tube or fiber membranes (e.g., having no porous support). The one or more hollow tube or fiber membranes can be in the form of a modular cartridge, such that the one or more membranes can be easily replaced or maintained. In one embodiment, the inside of the one or more hollow tube or fiber membranes can be the first side of the one or more membranes, and the outside of the one or more hollow tube or fiber membranes can be the second side of the one or more membranes. In another embodiment, the outside of the one or more hollow tube or fiber membranes can be the first side of the one or more membranes, and the inside of the one or more hollow tube or fiber membranes can be the second side of the one or more membranes. In some examples, a pressure difference is maintained between the first and second side of the one or more hollow tube or fiber membranes.

In some embodiments, various embodiments of the present invention can provide a module that allows limited or no heat transfer from the gaseous reactant to the liquid reactant or vice versa. In other embodiments, various embodiments of the present invention can provide a module that allows substantial heat transfer from the gaseous reactant to the liquid reactant or vice versa. For example, the present invention can provide a system that allows concurrent heat and mass exchange between the gaseous reactant and the liquid reactant.

In some embodiments, the membrane is supported on a porous or highly permeable non-porous substrate. The substrate can be any suitable substrate. A supported membrane has the majority of the surface area of at least one of the two major sides of the membrane contacting a porous or highly permeable non-porous substrate. A supported membrane on a porous substrate can be referred to as a composite membrane, where the membrane is a composite of the membrane and the porous substrate. The porous substrate on which the supported membrane is located can allow gases or liquids to pass through the pores and to reach the membrane. The supported membrane can be attached (e.g., adhered) to the porous substrate. The supported membrane can be in contact with the substrate without being adhered. The porous substrate can be partially integrated, fully integrated, or not integrated into the membrane. The porous substrate can be, for example, a filter, or any substrate of any suitable shape that includes a fibrous structure or any structure. The porous substrate can be woven or non-woven. The porous substrate can be a frit. The porous substrate can be any suitable porous material known to one of skill in the art, in any shape, such as having a surface including the membrane that is flat, curved, or any combination thereof. The surface can have any perimeter shape. The porous substrate can have any number of surfaces, and can be any three-dimensional shape. Examples of three-dimensional shapes include cubes, spheres, cones, and planar sections thereof with any thickness, including variable thicknesses, and porous hollow fibers. The porous substrate can have any number of pores, and the pores can be of any size, depth, shape, and distribution. In one example, the porous substrate has a pore size of from about 0.2 nm to about 500 mm, and can have any suitable number of pores.

In some embodiments, the membrane is unsupported, also referred to as free-standing. The majority of the surface area on each of the two major sides of a membrane that is free-standing is not contacting a substrate, whether the substrate is porous or not. In some embodiments, a membrane that is free-standing can be 100% unsupported. A membrane that is free-standing can be supported at the edges or at the minority (e.g., less than 50%) of the surface area on either or both major sides of the membrane. A free-standing membrane can have any suitable shape, regardless of the percent of the free-standing membrane that is supported. Examples of suitable shapes for free-standing membranes include, for example, squares, rectangles, circles, tubes, cubes, spheres, cones, cylinders, and planar sections thereof, with any thickness, including variable thicknesses.

Nonvolatile Liquid Reactant and Gaseous Reactant.

The method includes contacting a first side of the membrane with a liquid reactant. The liquid reactant is one or more compounds that can react with the gaseous reactant (e.g., with one or more gaseous compounds in the gaseous reactant). The liquid reactant can be contacted to the first side of the membrane in the form of a composition that includes the liquid reactant, wherein the composition at the first side of the membrane includes compounds that are not reactive with the gaseous reactant, such as one or more solvents (e.g., organic solvents) or any other suitable materials. Herein, in the description of properties or conditions of the liquid reactant at the first side of the membrane, such as pressure, flow rate, temperature, and other aspects of the liquid reactant, it is to be understood that a composition on the first side of the membrane that includes the liquid reactant can have the same properties or conditions, or properties or conditions such that the liquid reactant in the composition has the properties or conditions described. The liquid reactant can have any suitable concentration in the composition that includes the liquid reactant, such as about 0.001 wt % to about 99.999 wt %, or about 1 wt % to about 99 wt %, or about 0.001 wt % or less, 0.01 wt %, 0.1, 1, 2, 3, 4, 5, 10, 15, 20, 25, 30, 40, 50, 60, 70, 75, 80, 85, 90, 95, 96, 97, 98, 99, 99.9, 99.99, or about 99.999 wt % or more.

The nonvolatile liquid reactant is a liquid at standard temperature and pressure, and can have a boiling point at 101 kPa of about 30° C. to about 1,500° C., or about 50° C. to about 1,000° C., or about 75° C. to about 500° C., or about 100° C. to about 400° C., or about 30° C. or less, or about 40° C., 50, 60, 70, 80, 90, 100, 110, 120, 130, 140, 150, 160, 170, 180, 190, 200, 220, 240, 260, 280, 300, 350, 400, 450, 500, 550, 600, 700, 800, 900, 1,000, 1,250, or about 1,500° C. or more. At standard temperature and pressure, the nonvolatile liquid reactant can have a boiling point of about 0.000,1 kPa to 80 kPa, about 0.001 kPa to about 50 kPa, about 0.001 kPa to about 25 kPa, or about 0.000,1 kPa or less, or about 0.001 kPa, 0.01, 0.1, 1, 2, 3, 4, 5, 10, 15, 20, 25, 30 35, 40, 45, 50, 55, 60, 65, 70, 75, or about 80 kPa or less. Other components (if any) in a composition that includes the liquid reactant can be liquids (e.g., the liquid reactant can be dissolved in a liquid), or gases (e.g., a liquid composition contacting the first side of the membrane and including the liquid reactant can include a dissolved gas therein), such as at the time of contacting with the first side of the membrane.

In various embodiments, the reaction between the liquid reactant and the gaseous reactant can be a hydrosilylation reaction. In a hydrosilylation reaction, an organosilicon compound that includes a silicon atom with a silicon-bonded hydrogen atom can react with an unsaturated group such as an alkenyl group, adding across the unsaturated group and causing the unsaturated group to lose at least one degree of unsaturation (e.g., a double bond is converted to a single bond), such that the silicon atom is bound to one carbon atom of the originally unsaturated group, and the hydrogen atom is bound to the other carbon atom of the originally unsaturated group. In some embodiments, a hydrosilylation catalyst is present in the liquid reactant. In other embodiments, the hydrosilylation catalyst is not present in the liquid reactant.

In some embodiments, the hydrosilylation catalyst can be any hydrosilylation catalyst including a platinum group metal or a compound containing a platinum group metal. Platinum group metals can include platinum, rhodium, ruthenium, palladium, osmium and iridium. Examples of hydrosilylation catalysts include the complexes of chloroplatinic acid and certain vinyl-containing organosiloxanes disclosed by Willing in U.S. Pat. No. 3,419,593, such as the reaction product of chloroplatinic acid and 1,3-divinyl-1,1,3,3-tetramethyldisiloxane; microencapsulated hydrosilylation catalysts including a platinum group metal encapsulated in a thermoplastic resin, as exemplified in U.S. Pat. No. 4,766,176 and U.S. Pat. No. 5,017,654; and photoactivated hydrosilylation catalysts, such as platinum(II) bis(2,4-pentanedioate), as exemplified in U.S. Pat. No. 7,799,842. An example of a suitable hydrosilylation catalyst can include a platinum(IV) complex of 1,3-diethenyl-1,1,3,3-tetramethyldisiloxane. In another embodiment, the hydrosilylation catalyst can be at least one photoactivated hydrosilylation catalyst. The photoactivated hydrosilylation catalyst can be any of the well-known hydrosilylation catalysts including a platinum group metal or a compound containing a platinum group metal. The concentration of the hydrosilylation catalyst in a composition including the liquid reactant can be sufficient to catalyze hydrosilylation of the liquid reactant and the gaseous reactant. The concentration of the hydrosilylation catalyst can be sufficient to provide from about 0.1 to about 1000 ppm of a platinum group metal in the liquid reactant, from about 0.5 to about 500 ppm of a platinum group metal, or from about 1 to about 100 ppm of a platinum group metal.

The method includes contacting a second side of the membrane with a gaseous reactant. The gaseous reactant is one or more compounds that can react with the liquid reactant (e.g., with the one or more liquid reactants). The gaseous reactant can be contacted to the second side of the membrane in the form of a composition that includes the gaseous reactant, e.g., the composition can include one or more organic solvents or one or more gases (e.g., inert gases or other gases). A composition contacted to the second side of the membrane including the gaseous reactant can include compounds that are at least one of substantially permeable through the membrane and substantially impermeable through the membrane, and that are at least one of reactive with the liquid reactant and substantially unreactive with the liquid reactant. A composition including the gaseous reactant can be in a liquid or gaseous state at the time of contacting to the membrane. In some embodiments, the gaseous reactant is dissolved in one or more liquid components at the second side of the membrane; while in other embodiments, the gaseous reactant is mixed with other gaseous components at the second side of the membrane. Herein, in the description of properties or conditions of the gaseous reactant at the second side of the membrane, such as pressure, flow rate, temperature, and other aspects of the gaseous reactant, it is to be understand that a composition on the second side of the membrane that includes the gaseous reactant can have the same properties or conditions, or properties or conditions such that the gaseous reactant in the composition has the properties or conditions described. The gaseous reactant can have any suitable concentration in the composition that includes the gaseous reactant, such as about 0.001 wt % to about 99.999 wt %, or about 1 wt % to about 99 wt %, or about 0.001 wt % or less, 0.01 wt %, 0.1, 1, 2, 3, 4, 5, 10, 15, 20, 25, 30, 40, 50, 60, 70, 75, 80, 85, 90, 95, 96, 97, 98, 99, 99.9, 99.99, or about 99.999 wt % or more.

The gaseous reactant can be a gas (e.g, a gas or vapor), a liquid, or a solid at standard temperature and pressure, and can have a boiling or sublimation point at 101 kPa of about −500° C. to about 150° C., or about −250° C. to about 100° C., or about −200° C. to about 50° C., or about −100° C. to about 25° C., or about −500° C. or less, or about −450° C., −400, −350, −300, −250, −200, −150, −100, −50, −25, −10, 0, 10, 20, 30, 40, 50, 60, 70, 80, 90, 100, 125, or about 150° C. In various embodiments, material that becomes that gaseous reactant or the composition including the gaseous reactant can be at least one of heated and subjected to a reduced pressure (e.g., below ambient pressure) such that the material is gaseous at the time of contacting to the second side of the membrane. Other components (if any) in a composition that includes the gaseous reactant can be liquids (e.g., the gaseous reactant can be dissolved in a liquid), or gases, such as at the time of contacting with the second side of the membrane. In some embodiments, the gaseous reactant can be contacted to the second side of the membrane by exposing a sublimable solid (e.g., dry ice) or gas-generating solid (e.g., ammonium carbonate) to conditions sufficient (e.g., temperature or pressure) to produce the gaseous reactant (e.g., $CO_2$ or ammonia which can subsequently be contacted to the second side of the membrane.

The nonvolatile liquid reactant can have at least one functional group that can react with the gaseous reactant, such as via a hydrosilylation reaction. In some examples, the liquid reactant can include an Si—H bond, such as an organopolysiloxane (e.g., a polyorganohydridosiloxane or a copolymer including organohydridosiloxane repeating units) or a silane, and the gaseous react can include a carbon-carbon unsaturated bond. In some examples, the liquid reactant can include a carbon-carbon unsaturated bond, and the gaseous reactant can include an Si—H bond, such as an organopolysiloxane (e.g., a polyorganohydridosiloxane or a copolymer including the same) or a silane. A carbon-carbon unsaturated bond can be at least one of nonaromatic, unconjugated, and aliphatic. A carbon-carbon unsaturated bond can be a double bond or a triple bond. In some embodiments, the liquid reactant can react with the gaseous reactant via a hydrogenation reaction, with the gaseous reactant including hydrogen and the liquid reactant including a silicon-containing compound having at least one carbon-carbon unsaturated bond.

In various embodiments, at least one of the gaseous reactant and the liquid reactant can include at least one organopolysiloxane including an Si—H bond, such as an organohydrogenpolysiloxane or a copolymer thereof. In some examples, the organohydrogenpolysiloxane compound has an average of at least one, at least two, or more than two silicon-bonded hydrogen atoms. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane. The silicon-bonded hydrogen atoms in the organosilicon compound can be located at terminal, pendant, or at both terminal and pendant positions.

In various embodiments, the organohydrogenpolysiloxane compound can have an average of 1 Si—H unit per molecule, about 2, 3, 4, 5, or less than about 5, or of at least about 5, 10, 15, 20, 25, 30, 35, 40, 45, 50, 55, 60, 65, 70, 80, 100, 200, or greater than about 200 Si—H units per molecule.

In one example, an organohydrogenpolysiloxane can include a compound of the formula

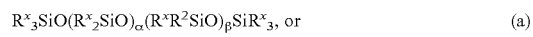

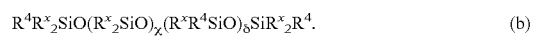

In formula (a), α has an average value of about 0 to about 500,000, and β has an average value of about 1 to about 500,000. Each $R^x$ is independently a monovalent functional group. Suitable monovalent functional groups include, but are not limited to, acrylic groups; alkyl; halogenated hydrocarbon groups; alkenyl; alkynyl; aryl; and cyanoalkyl. Each $R^2$ is independently H or $R^x$. In some embodiments, β is about 1, 2, 3, 4, 5, 6, 8, 10, 12, 14, 16, 18, 20, 40, 60, 80, 100, 120, 140, 160, 180, or about 200 or more. In formula (b), χ has an average value of 0 to 500,000, and δ has an average value of 0 to 500,000. Each $R^x$ is independently as described above. Each $R^4$ is independently H or $R^x$. In some embodiments, δ is about 1, 2, 3, 4, 5, 6, 8, 10, 12, 14, 16, 18, 20, 40, 60, 80, 100, 120, 140, 160, 180, or about 200 or more.

Examples of organohydrogenpolysiloxanes can include compounds having the average unit formula

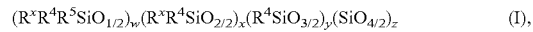

wherein $R^x$ is independently as defined above, $R^4$ is H or $R^x$, $R^5$ is H or $R^x$, $0 \le w \le 1$, $0 \le x < 1$, $0 \le y < 1$, $0 \le z < 0.95$, and $w+x+y+z \approx 1$. In some embodiments, $R^1$ is $C_{1-10}$ hydrocarbyl or $C_{1-10}$ halogen-substituted hydrocarbyl, both free of aliphatic unsaturation, or $C_4$ to $C_{14}$ aryl. In some embodiments, w is from 0.01 to 0.6, x is from 0 to 0.5, y is from 0 to 0.95, z is from 0 to 0.4, and $w+x+y+z \approx 1$.

An organohydrogenpolysiloxane can be a cyclic polysiloxane, such as a cyclic poly(substituted or unsubstituted $(C_1-C_{20})$hydrocarbyl)hydrogensiloxane, a cyclic poly(substituted or unsubstituted$(C_1-C_{10})$alkyl)hydrogensiloxane, a cyclic poly(substituted or unsubstituted$(C_1-C_5)$alkyl)hydrogensiloxane, a cyclic poly$((C_1-C_3)$alkyl)hydrogensiloxane, or a cyclic polymethylhydrogensiloxane, such as a tetramethyl tetracyclosiloxane, wherein each hydrocarbyl and each alkyl is independently selected.

In some embodiments, at least one of the gaseous reactant and the liquid reactant can include at least one silane including an Si—H bond. The silane including the Si—H bond can be any suitable silane. In some examples, the silane can be a (halo)$_a$(substituted or unsubstituted $(C_1-C_{20})$hydrocarbyl)$_b$-Si—H wherein a+b=3 and a is 1, 2, or 3 and b is 1, 2, or 3 (e.g., $HMe_2SiCl$), or the silane can be a (substituted or unsubstituted $(C_1-C_{20})$hydrocarbyl)$_3$-Si—H, a (substituted or unsubstituted $(C_1-C_{10})$alkyl)$_3$-Si—H, a (substituted or unsubstituted $(C_1-C_5)$alkyl)$_3$-Si—H, a $((C_1-C_3)$alkyl)$_3$-Si—H, or trimethylsilane, wherein each substituted or unsubstituted hydrocarbyl and substituted or unsubstituted alkyl is independently selected.

In some embodiments, at least one of the gaseous reactant and the liquid reactant can include at least one compound including at least one unsaturated carbon-carbon bond. Examples of aliphatic unsaturated carbon-carbon bond-containing groups can include alkenyl groups such as vinyl, allyl, butenyl, and hexenyl; alkynyl groups such as ethynyl, propynyl, and butynyl; and acrylate-functional groups such as acryloyloxyalkyl or methacryloyloxypropyl. In some embodiments, the compound having at least one carbon-carbon unsaturated bond can be (i) an organosilicon compound having at least one unsaturated aliphatic carbon-carbon bond per molecule (e.g., at least one alkenyl or alkynyl group per molecule), or (ii) at least one organic compound having at least one unsaturated aliphatic carbon-carbon bond per molecule (e.g., at least one alkenyl or alkynyl group per molecule).

The compound having at least one carbon-carbon unsaturated bond can be an organosilicon compound having an average of at least one aliphatic unsaturated carbon-carbon bond per molecule. The organosilicon compound having an average of at least one aliphatic unsaturated carbon-carbon bond per molecule can be any suitable organosilicon compound, wherein the unsaturated carbon-carbon bond can be part of a silicon-bonded group; for example, the organosilicon compound can have at least one silicon-bonded aliphatic unsaturated carbon-carbon bond-containing group. In some embodiments, the organosilicon compound has at least one, two, or at least three aliphatic unsaturated carbon-carbon bonds per molecule. The unsaturated carbon-carbon bond can be directly bound to a silicon atom (e.g., Si-Vi), can be spaced from a silicon atom via a hydrocarbyl spacer (e.g., Si-(substituted or unsubstituted $(C_1-C_{10})$hydrocarbyl)-vinyl), or can be at an intermediate (non-terminal) position (e.g., Si—$CH_2$—$CH_2$—CH=CH—$CH_2$—$CH_3$). The organosilicon compound can be a poly$(C_1-C_{10})$alkenyl$(C_1-C_{10})$alkylsiloxane, such as a polyvinylmethylsiloxane, such as a polyvinylmethylsiloxane-polydimethylsiloxane copolymer. The organosilicon compound can be an alkenylhalosilane, such as a (halo)$_a$(substituted or unsubstituted $(C_1-C_{20})$ alkenyl)$_b$-Si—H wherein a+b=3 and a is 1, 2, or 3 and b is 1, 2, or 3 (e.g., $ViMe_2SiCl$)

The organosilicon compound can be an organosilane or an organosiloxane. The organosilane can be a monosilane, disilane, trisilane, or polysilane, and the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms. In acyclic polysilanes and polysiloxanes, the aliphatic unsaturated carbon-carbon bonds can be located at least one of terminal and pendant positions.

Examples of organosilanes including a carbon-carbon bond include $Vi_4Si$, $PhSiVi_3$, $MeSiVi_3$, $PhMeSiVi_2$, $Ph_2SiVi_2$, and $PhSi(CH_2CH=CH_2)_3$, $ViSiMe_3$, where Me is methyl, Ph is phenyl, and Vi is vinyl.

In some embodiments, the compound having at least one carbon-carbon unsaturated bond is an organopolysiloxane of the formula

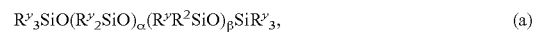  (a)

  (b)

or combinations thereof.

In formula (a), α has an average value of 0 to 2000, such as 0, 1, 2, 3, 4, 5, 6, 8, 10, 12, 14, 16, 18, 20, 40, 60, 80, 100, 120, 140, 160, 180, or about 200 or more. In formula (a), β has an average value of 1 to 2000, such as 1, 2, 3, 4, 5, 6, 8, 10, 12, 14, 16, 18, 20, 40, 60, 80, 100, 120, 140, 160, 180, or about 200 or more. Each $R^y$ is independently a monovalent organic group, such as those listed for $R^x$ herein, or acrylic functional groups such as acryloyloxypropyl and methacryloyloxypropyl; alkenyl groups such as vinyl, allyl, and butenyl; alkynyl groups such as ethynyl and propynyl; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole; epoxyalkyl groups such as 3-glycidoxypropyl, 2-(3,4-epoxycyclohexyl)ethyl, and 5,6-epoxyhexyl; isocyanate and masked isocyanate functional groups such as 3-isocyanatopropyl, tris-3-propylisocyanurate, propyl-t-butylcarbamate, and propylethylcarbamate; aldehyde functional groups such as undecanal and butyraldehyde; anhydride functional groups such as 3-propyl succinic anhydride and 3-propyl maleic anhydride; carboxylic acid functional groups such as 3-carboxypropyl and 2-carboxyethyl; and metal salts of carboxylic acids such as the Zn, Na or K salts of 3-carboxypropyl and 2-carboxyethyl. Each $R^2$ is independently an unsaturated monovalent aliphatic carbon-carbon bond-containing group, as described herein, or $R^y$. In formula (b), X has an average value of 0 to 2000, such as 0, 1, 2, 3, 4, 5, 6, 8, 10, 12, 14, 16, 18, 20, 40, 60, 80, 100, 120, 140, 160, 180, or about 200 or more. In formula (b), δ has an average value of 1 to 2000, such as 1, 2, 3, 4, 5, 6, 8, 10, 12, 14, 16, 18, 20, 40, 60, 80, 100, 120, 140, 160, 180, or about 200 or more. Each $R^y$ is independently as defined above, and $R^4$ is independently the same as defined for $R^2$ above.

Examples of organopolysiloxanes having an average of at least one aliphatic unsaturated carbon-carbon bond per molecule include compounds having the average unit formula

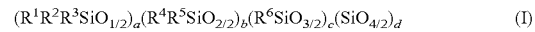  (I)

wherein $R^1$, $R^2$, $R^3$, $R^4$, $R^5$, and $R^6$ are organic groups independently selected from $R^y$ or $R^2$ as defined above, $0 \le a < 0.95$, $0 \le b < 1$, $0 \le c < 1$, $0 \le d \le 1$, $a+b+c+d=1$.

The compound including at least one carbon-carbon bond can be an organic compound having an average of at least one aliphatic unsaturated carbon-carbon bond per molecule, such as alkenyl or alkynyl groups. The organic compound can be any organic compound containing at least one aliphatic unsaturated carbon-carbon bond per molecule. The organic compound can be a diene, a triene, or a polyene. The unsaturated compound can have a linear, branched, or cyclic structure. In acyclic organic compounds, the unsaturated carbon-carbon bonds can be located at terminal, pendant, or at both terminal and pendant positions. Examples can include 1,4-butadiene, 1,6-hexadiene, 1,8-octadiene, and internally unsaturated variants thereof.

In one example, the organic compound having an average of at least one alkenyl groups per molecule is an ether or a polyether, such as a $(C_2-C_{10})$alkenyl-O-(substituted or unsubstituted $(C_1-C_{10})$hydrocarbyl) or a $(C_2-C_{10})$alkenyl-O-(substituted or unsubstituted $(C_1-C_{10})$hydrocarbylene)$_{DP}$-(substituted or unsubstituted $(C_1-C_{10})$hydrocarbyl). The compound can have the structure $(C_2-C_5)$alkenyl-O-(substituted or unsubstituted $(C_2-C_5)$alkanyleneoxy)$_{DP}$-$(C_2-C_5)$alkenyl or HO-(substituted or unsubstituted $(C_2-C_5)$alkanyleneoxy)$_{DP}$-$(C_2-C_5)$alkenyl. The compound can have the structure $(C_2-C_5)$alkenyl-O-(substituted or unsubstituted $(C_2-C_3)$alkanyleneoxy)$_{DP}$-$(C_2-C_5)$alkenyl or HO-(substituted or unsubstituted $(C_2-C_3)$alkanyleneoxy)$_{DP}$-$(C_2-C_5)$alkenyl. The compound can have the structure $(C_2-C_3)$alkenyl-O-(substituted or unsubstituted ethaneoxy)$_{DP}$-$(C_2-C_3)$alkenyl or HO-(substituted or unsubstituted ethaneoxy)$_{DP}$-$(C_2-C_3)$alkenyl. DP is the degree of polymerization of the organic compound and can be about 1 about 100,000, about 2 to about 100, about 2 to 50, about 2 or less, or about 4, 6, 8, 10, 12, 14, 16, 18, 20, 25, 30, 35, 40, 45, 50, 60, 70, 80, 90, 100, 125, 150, 175, 200, 250, 500, 1,000, 10,000, or about 100,000 or more. In some examples, the organic compound can be a mono-allyl terminated polyethylene glycol, or allyl glycidyl ether.

Other Components.

Any optional ingredient described herein can be present in at least one of the membrane, in the composition that forms the membrane, in the gaseous reactant, and in the liquid reactant; any optional ingredient described herein can be absent from at least one of the membrane, the composition that forms the membrane, the gaseous reactant, and the liquid reactant. Without limitation, examples of such optional additional components include surfactants, emulsifiers, dispersants, polymeric stabilizers, crosslinking agents, combinations of polymers, crosslinking agents, catalysts useful for providing a secondary polymerization or crosslinking of particles, rheology modifiers, density modifiers, aziridine stabilizers, cure modifiers such as hydroquinone and hindered amines, free-radical initiators, polymers, diluents, acid acceptors, antioxidants, heat stabilizers, flame retardants, scavenging agents, silylating agents, foam stabilizers, solvents, diluents, plasticizers, fillers and inorganic particles, pigments, dyes and dessicants. Liquids can optionally be used. An example of a liquid includes water, an organic solvent, any liquid organic compound, a silicone liquid, organic oils, ionic fluids, and supercritical fluids. Other optional ingredients include polyethers having at least one alkenyl group per molecule, thickening agents, fillers and inorganic particles, stabilizing agents, waxes or waxlike materials, silicones, organofunctional siloxanes, alkylmethylsiloxanes, siloxane resins, silicone gums, silicone carbinol fluids can be optional components, water soluble or water dispersible silicone polyether compositions, silicone rubber, hydrosilylation catalyst inhibitors, adhesion promoters, heat stabilizers, UV stabilizers, and flow control additives.

EXAMPLES

Various embodiments of the present invention can be better understood by reference to the following Examples which are offered by way of illustration. The present invention is not limited to the Examples given herein.

Example 1

A mixture ("Mixture 1") comprising 49.9 g of a mono-allyl terminated polyethylene glycol having a number average degree of polymerization of approximately 11 ethylene oxide units (Dow Chemical Company®) and 0.1 g of a 1% Pt (w/w) in the form of Karstedt's catalyst in isopropanol (Catalyst 1) was prepared and mixed thoroughly in a bottle. A total of 23 g of the mixture was pumped into the shell side of a 0.25 m² silicone hollow fiber membrane (HFM) module (MedArray, Inc.) using a Manostat Carter Cassette Pump with 1.42 mm inner diameter tubing. The fluid was pumped through a section of ⅛" stainless steel tubing before entering the HFM module. Both the stainless steel tubing and the module were wrapped with heat tape controlled by separate temperature controllers. Both were also wrapped with fiberglass insulation. The mixture was pumped through the module with a setting of 100 rpm (corresponding to an approximate rate of 10.6 mL/min). Trimethylsilane (TMS) (Gelest) was passed through the bore side of the HFM. The TMS was regulated to a pressure of 5 psi and a flow rate of 5 cc/min. A total of 8.4 g TMS was used for this experiment. The TMS exit was equipped with a bubbler so that flow could be verified visually. Unused ports on the module were sealed off.

The fluid temperature entering and exiting the module was monitored. The fluid was recycled from a small reservoir for the entirety of the experiment. Steady state temperatures for this experiment were 64° C. at the fluid inlet and 51° C. at the fluid outlet.

A sample was taken every hour and tested on an infrared spectrometer equipped with a single bounce attenuated total reflectance apparatus (zinc selenide crystal). The reaction product confirmed the progressive disappearance of the C═C double bond peak at 3080 cm$^{-1}$ as the reaction progressed until it was no longer detectable after 5 hours.

Example 2. (Prophetic)

The method of Example 1 was followed, but used a mixture (Mixture 2) comprising 50.0 g of PHMS-PDMS and 0.1 g Catalyst 1. A total of 23 g of the mixture was pumped into the shell side of the HFM with a setting of 100 rpm (corresponding to an approximate rate of 10.6 mL/min). Ethylene gas ($C_2H_4$) (Sigma-Aldrich®) was passed through the bore side of the HFM. The $C_2H_4$ was regulated to a pressure of 5 psi and a flow rate of 5 cc/min for 16 hours. Steady state temperatures for this experiment were 70° C. at the fluid inlet and 60° C. at the fluid outlet. The reaction product confirmed the progressive disappearance of the SiH peak at 2160 cm$^{-1}$, demonstrating the utility of this method to cap SiH groups with a gas phase reactant.

Example 3. (Prophetic)

The method of Example 2 was followed, but using a different gas phase reagent. A total of 23 g of the Mixture 2 was pumped into the shell side of the HFM with a setting of 100 rpm (corresponding to an approximate rate of 10.6 mL/min). Styrene (Sigma-Aldrich®) stabilized with hydroquinone monomethyl ether (MEHQ) and phenothiazine inhibitors was heated to 70° C. then passed through the bore side of the HFM to create a vapor. The styrene was regulated to a pressure of 5 psi and a flow rate of 5 cc/min for 16 hours. Steady state temperatures for this experiment were 90° C. at the fluid inlet and 75° C. at the fluid outlet. The reaction product confirmed the progressive disappearance of the SiH peak at 2160 $cm^{-1}$, demonstrating the utility of this method to produce an aromatically modified silicone product.

Example 4. (Prophetic)

The method of Example 2 was followed, but using a different gas phase reagent. A total of 23 g of the Mixture 2 was pumped into the shell side of the HFM with a setting of 100 rpm (corresponding to an approximate rate of 10.6 mL/min). α-Methylstyrene (Sigma-Aldrich®) stabilized with MEHQ and phenothiazine inhibitors was heated to 70° C. then passed through the bore side of the HFM to create a vapor. The α-methylstyrene was regulated to a pressure of 5 psi and a flow rate of 5 cc/min for 16 hours. Steady state temperatures for this experiment were 90° C. at the fluid inlet and 75° C. at the fluid outlet. The reaction product confirmed the progressive disappearance of the SiH peak at 2160 $cm^{-1}$, demonstrating the utility of this method to produce an aromatically modified silicone product.

Example 5. (Prophetic)

The method of Example 2 was followed, but using a different gas phase reagent. A total of 23 g of the Mixture 2 was pumped into the shell side of the HFM with a setting of 100 rpm (corresponding to an approximate rate of 10.6 mL/min). 1-Propene was fed through the bore side of the HFM. The propene was regulated to a pressure of 5 psi and a flow rate of 5 cc/min for 16 hours. Steady state temperatures for this experiment were 70° C. at the fluid inlet and 55° C. at the fluid outlet. The reaction product confirmed the progressive disappearance of the SiH peak at 2160 $cm^{-1}$, demonstrating the utility of this method to produce a siloxane modified with alkyl groups.

Example 6. (Prophetic)

The method of Example 1 was followed, but using a different liquid and gas phase reactant. A Mixture 3 was made by combining 50 g of allyl glycidyl ether and 0.1 g of Catalyst 1. A total of 23 g of the Mixture 3 was pumped into the shell side of the HFM with a setting of 100 rpm (corresponding to an approximate rate of 10.6 mL/min). Tetramethyl tetracyclosiloxane (D4H) was fed through the bore side of the HFM. The D4H was regulated to a pressure of 5 psi and a flow rate of 2 cc/min for 4 hours. Steady state temperatures for this experiment were 70° C. at the fluid inlet and 55° C. at the fluid outlet. The reaction product confirmed the progressive disappearance of the SiH peak at 2160 $cm^{-1}$, demonstrating the utility of this method to produce a siloxane modified with alkyl groups.

Example 7a. (Comparative)

In a 250 mL 3-neck glass reactor, vinyltrimethylsilane (VTMS) (25.1 g) was added. The flask was fitted with a reflux condenser, a thermocouple probe with a temperature controller, and an addition funnel containing 10 g of a trimethylsiloxy-terminated polydimethylsiloxane-polyhydridomethylsiloxane copolymer (PHMS-PDMS) (24.0 g) having a viscosity of about 0.03 Pa·s at 25° C. and having a molar ratio of hydridomethylsiloxane groups to dimethylsiloxane groups of about 2.4 and having a viscosity of about 0.030 Pa·s at 25° C. The reactor was placed in an oil bath that was maintained at ambient laboratory temperature (20° C.). To the reactor was then added 0.12 g of a Karstedt's catalyst complex (adduct of 1,3-diethenyl-1,1,3,3-tetramethyldisiloxane and chloroplatinic acid) dilution in toluene containing 0.26% Pt (w/w) (Catalyst 2) and stirred magnetically. About 5 mL of the PHMS-PDMS was added to the reactor dropwise, and the temperature was gradually raised to a setpoint of 65° C. After equilibrating at 63° C., dropwise addition of PHMS-PDMS was resumed. The temperature was observed to rise significantly over the next 13 minutes, indicative of the desired exothermic hydrosilylation reaction. The reaction product was tested by ATR-IR according to the method of Reference Example 2 and showed a large decrease in the SiH peak intensity at 2155 $cm^{-1}$ compared to an uncatalyzed cold mixture of the same concentration of reactants. The reaction was driven to completion by heating the product further in a differential scanning calorimetry (DSC) pan to 160° C., showing a small exotherm indicative of the reaction of residual reactants.

One of the challenges observed in this reaction has been the high volatility of the VTMS component, requiring a very tall condenser to prevent escape of the VTMS. This limits the extent to which the reaction temperature and/or reaction time can be raised to increase the conversion of the reaction. Also, the significant reaction exotherm observed in this procedure at small scale poses a risk that requires careful monitoring of reaction conditions and measures such as cooling jackets on the reaction vessels to avoid dangerous run-away conditions when performed at larger scales.

Example 7b. (Prophetic)

The method of Example 2 was followed, but using a different liquid and gas phase reactant. A Mixture 4 was made by combining 50 g of a polyvinylmethylsiloxane-polydimethylsiloxane copolymer (having a mole ratio of vinylmethylsiloxane groups to dimethyl siloxane groups of about 2.4), and 0.1 g of Catalyst 1. A total of 23 g of the Mixture 4 was pumped into the shell side of the HFM with a setting of 100 rpm (corresponding to an approximate rate of 10.6 mL/min). Trimethylsilane (TMS) was fed through the bore side of the HFM. The trimethylsilane was regulated to a pressure of 5 psi and a flow rate of 6 cc/min for 5 hours. Steady state temperatures for this experiment were 70° C. at the fluid inlet and 60° C. at the fluid outlet. The reaction product confirmed the progressive disappearance of the C=C double bond peak at 3080 $cm^{-1}$ as the reaction progressed until it was no longer detectable after 5 hours.

Comparative Example 7a can be viewed as a control for Example 7b, since the structure of the products are the same or similar. This Example demonstrates formation of a product through a hydrosilylation reaction while avoiding some of the disadvantageous aspects of Comparative Example 7a (e.g., no large condenser required, high level of conversion, limited exotherm).

Example 8. (Prophetic)

The method of Example 1 was followed but using different liquid and gas phase reactant. A silicone polyether product was produced from the hydrosilylaton reaction of a mono-allyl-terminated polyethylene glycol having a number average of 12 EO units and 1,1,1,2,3,3,3-heptamethyltrisiloxane using 20 ppm of Karstedt's catalyst at 70° C. The resulting product had approximately 10 wt % of unreacted polyether arising from the isomerization of the terminal unsaturated unit. A mixture 5 was produced by combining 50 g of this product with 5 g of 5% Pd/C catalyst (Johnson Matthey) and fed into the shell side of the HFM with a setting of 100 rpm (corresponding to an approximate rate of 10.6 mL/min). Hydrogen gas was fed into the bore side of the HFM. The $H_2$ was regulated to a pressure of 5 psig and a flow rate of 5 ccm for 5 hours. Steady state temperatures for this experiment were 70° C. at the fluid inlet and 60° C. at the fluid outlet. The reaction product was studied by $^1H$ NMR and $^{13}C$ NMR and was shown to be free of residual unsaturated groups after 2 hours.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of forming an organosilicon product, the method comprising:
contacting a first side of a membrane with a nonvolatile liquid reactant; and
contacting a second side of the membrane with a gaseous reactant, wherein the contacting is sufficient to react the gaseous reactant with the liquid reactant to form an organosilicon product on the first side of the membrane, wherein the membrane is substantially impermeable to the liquid reactant and substantially permeable to the gaseous reactant.

Embodiment 2 provides the method of Embodiment 1, wherein the membrane is a silicone membrane.

Embodiment 3 provides the method of Embodiment 1, wherein the membrane is nonporous.

Embodiment 4 provides the method of Embodiment 3, wherein the membrane is a dense membrane.

Embodiment 5 provides the method of any one of Embodiments 1-4, wherein the membrane has a thickness of from 1 to 300 μm.

Embodiment 6 provides the method of any one of Embodiments 1-5, wherein the membrane is a free-standing membrane.

Embodiment 7 provides the method of any one of Embodiments 1-6, wherein the membrane is a hollow fiber membrane module comprising a bundle of hollow fibers, wherein the fibers collectively have a bore side and a shell side, wherein the first side of the hollow fiber membrane is the bore side and the second side of the hollow fiber membrane is the shell side, or the first side of the hollow fiber membrane is the shell side and the second side of the hollow fiber membrane is the bore side.

Embodiment 8 provides the method of any one of Embodiments 1-7, wherein the liquid reactant comprises a compound having at least one silicon-bonded hydrogen atom, and the gaseous reactant comprises a compound having at least one carbon-carbon multiple bond.

Embodiment 9 provides the method of Embodiment 8, wherein the compound having at least one silicon-bonded hydrogen atom is an organopolysiloxane.

Embodiment 10 provides the method of any one of Embodiments 1-7, wherein the liquid reactant comprises a compound having at least one carbon-carbon multiple bond, and the gaseous reactant comprises a compound having at least one silicon-bonded hydrogen atom.

Embodiment 11 provides the method of Embodiment 10, wherein the compound having at least one silicon-bonded hydrogen atom is a silane or siloxane.

Embodiment 12 provides the method of any one of Embodiments 10-11, wherein the compound having at least one carbon-carbon multiple bond is a polyether.

Embodiment 13 provides the method of any one of Embodiments 10-12, wherein the compound having at least one carbon-carbon multiple bond is an organopolysiloxane.

Embodiment 14 provides the method of any one of Embodiments 8-13, wherein the liquid reactant comprises a platinum group catalyst.

Embodiment 15 provides the method according to any one of Embodiments 1-14, wherein the gaseous reactant is produced by converting a liquid to a gaseous state.

Embodiment 16 provides the method of any one of Embodiments 1-15, wherein the organosilicon product is a silicone-polyether copolymer.

Embodiment 17 provides the method of any one of Embodiments 1-4, wherein the liquid reactant comprises an unsaturated organosilicon compound and a hydrogenation catalyst, and the gaseous reactant comprises hydrogen.

Embodiment 18 provides a method of forming an organosilicon product, the method comprising:
contacting a first side of a dense silicone membrane with a nonvolatile liquid reactant comprising a compound having at least one silicon-bonded hydrogen atom and a platinum group catalyst; and
contacting a second side of the membrane with a gaseous reactant comprising a compound having at least one carbon-carbon multiple bond, wherein the contacting is sufficient to react the gaseous reactant with the liquid reactant via a hydrosilylation reaction to form an organosilicon product on the first side of the silicone membrane, wherein the silicone membrane is substantially impermeable to the liquid reactant and substantially permeable to the gaseous reactant.

Embodiment 19 provides a method of forming an organosilicon product, the method comprising:
contacting a first side of a dense silicone membrane with a nonvolatile liquid reactant comprising a compound having at least one carbon-carbon multiple bond and a platinum group catalyst; and
contacting a second side of the membrane with a gaseous reactant comprising a compound having at least one silicon-bonded hydrogen atom, wherein the contacting is sufficient to react the gaseous reactant with the liquid reactant via a hydrosilylation reaction to form an organosilicon product on the first side of the silicone membrane, wherein the silicone membrane is substantially impermeable to the liquid reactant and substantially permeable to the gaseous reactant.

Embodiment 20 provides a method of forming an organosilicon product, the method comprising:

contacting a first side of a dense silicone membrane with a nonvolatile liquid reactant comprising an unsaturated organic compound and a hydrogenation catalyst; and contacting a second side of the membrane with a gaseous reactant comprising hydrogen, wherein the contacting is sufficient to react the gaseous reactant with the liquid reactant to form an organosilicon product on the first side of the silicone membrane, wherein the silicone membrane is substantially impermeable to the liquid reactant and substantially permeable to the gaseous reactant.

Embodiment 21 provides the method of any one or any combination of Embodiments 1-21 optionally configured such that all elements or options recited are available to use or select from.

What is claimed is:

1. A method of forming an organosilicon product, the method comprising:
    contacting a first side of a membrane with a nonvolatile liquid reactant; and
    contacting a second side of the membrane with a gaseous reactant, wherein the contacting is sufficient to react the gaseous reactant with the liquid reactant to form an organosilicon product on the first side of the membrane, wherein the membrane is substantially impermeable to the liquid reactant and substantially permeable to the gaseous reactant,
    wherein the liquid reactant comprises a compound having at least one silicon-bonded hydrogen atom, and the gaseous reactant comprises a compound having at least one carbon-carbon multiple bond or wherein the liquid reactant comprises a compound having at least one carbon-carbon multiple bond, and the gaseous reactant comprises a compound having at least one silicon-bonded hydrogen atom; and
    wherein the organosilicon produced is a polysiloxane or an organosilane comprising a monosilane, disilane, trisilane, or polysilane.

2. The method of claim 1, wherein the membrane is a silicone membrane.

3. The method of claim 1, wherein the membrane is nonporous.

4. The method of claim 3, wherein the membrane is a dense membrane.

5. The method of claim 1, wherein the membrane has a thickness of from 1 to 300 μm.

6. The method of claim 1, wherein the membrane is a free-standing membrane.

7. The method of claim 1, wherein the membrane is a hollow fiber membrane module comprising a bundle of hollow fibers, wherein the fibers collectively have a bore side and a shell side, wherein the first side of the hollow fiber membrane is the bore side and the second side of the hollow fiber membrane is the shell side, or the first side of the hollow fiber membrane is the shell side and the second side of the hollow fiber membrane is the bore side.

8. The method of claim 1, wherein the compound having at least one silicon-bonded hydrogen atom is an organopolysiloxane.

9. The method of claim 1, wherein the compound having at least one silicon-bonded hydrogen atom is a silane or siloxane.

10. The method of claim 1, wherein the compound having at least one carbon-carbon multiple bond is a polyether.

11. A method of forming an organosilicon product, the method comprising:
    contacting a first side of a dense silicone membrane with a nonvolatile liquid reactant comprising a compound having at least one silicon-bonded hydrogen atom and a platinum group catalyst; and
    contacting a second side of the membrane with a gaseous reactant comprising a compound having at least one carbon-carbon multiple bond, wherein the contacting is sufficient to react the gaseous reactant with the liquid reactant via a hydrosilylation reaction to form an organosilicon product on the first side of the silicone membrane, wherein the silicone membrane is substantially impermeable to the liquid reactant and substantially permeable to the gaseous reactant.

12. A method of forming an organosilicon product, the method comprising:
    contacting a first side of a dense silicone membrane with a nonvolatile liquid reactant comprising a compound having at least one carbon-carbon multiple bond and a platinum group catalyst; and
    contacting a second side of the membrane with a gaseous reactant comprising a compound having at least one silicon-bonded hydrogen atom, wherein the contacting is sufficient to react the gaseous reactant with the liquid reactant via a hydrosilylation reaction to form an organosilicon product on the first side of the silicone membrane, wherein the silicone membrane is substantially impermeable to the liquid reactant and substantially permeable to the gaseous reactant.

13. The method of claim 1, wherein the membrane is a dense silicone membrane, the nonvolatile liquid reactant comprises and unsaturated organic compound and a hydrogenation catalyst, the gaseous reactant comprises hydrogen.

* * * * *